UNITED STATES PATENT OFFICE.

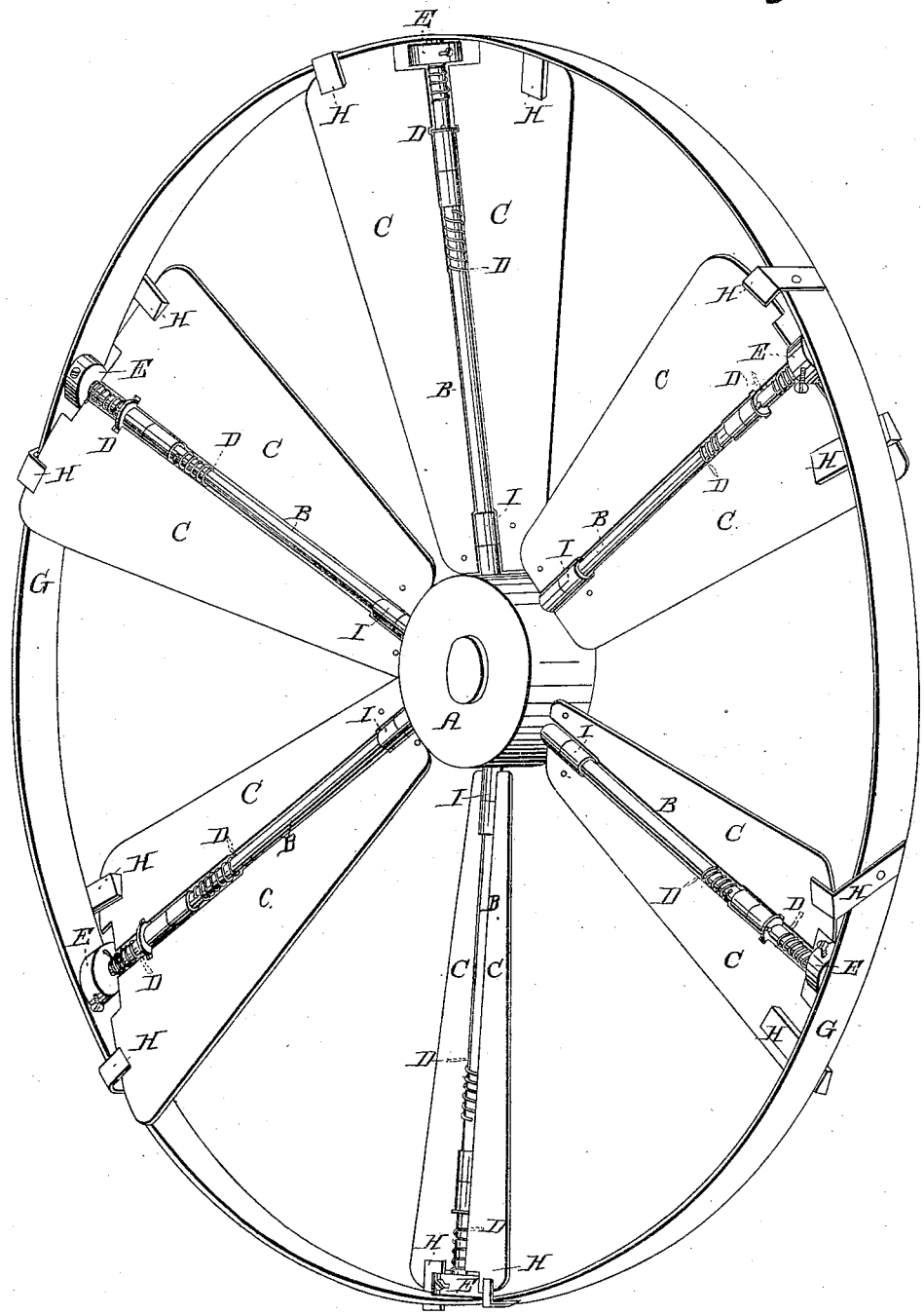

JOHN ELGAR, OF BALTIMORE, MARYLAND.

SELF-REGULATING WINDMILL.

Specification forming part of Letters Patent No. 13,244, dated July 10, 1855.

*To all whom it may concern:*

Be it known that I, JOHN ELGAR, of Baltimore, in the county of Baltimore, in the State of Maryland, have invented a new and Improved Mode of Constructing Windmill-Wheels; and I do hereby declare that the following is a full and exact description thereof, reference being had to the accompanying drawing, and to the letters of reference marked thereon.

The object I have had in view was to make a wind-wheel that should contain within itself a principle of compensation or self-government, and this I have accomplished by bringing into operation the combined and reciprocal action of the wind and springs upon movable and stationary sails, or what I shall hereinafter call "wings," constructed in the following manner, viz: There are two wings hung with hinges by their edges to each arm of a vertical wheel independent of each other, which may revolve about their hinges within certain limits, and are kept up against stops in their proper angle to the wind in plane with each other by springs acting on the back of the wings. The wings, which in the rotation of the wheel are aft of the arms, are held up to their stops by springs so strong as to yield only in a storm, and thus relieve the wheel from too great pressure. In common winds they are stationary and furnish the means of a constant power to propel the wheel, while the wings which are forward of the arms in the revolution of the wheel are held up to their stops in light winds by weaker springs, and move back when the breeze is stronger. Every degree of movement back brings the wings nearer into the plane of the wheel, and thus lessens the power of the wind to produce rotation, and when forced quite into the plane of the wheel their effective power is wholly neutralized. This effect is produced only by a force of wind sufficient to propel the wheel at a proper speed by the stationary wings alone. As the strength of the wind increases these wings are forced back beyond the plane of the wheel and then become a retarding power, and when impelled to an angle with the plane of the wheel equal to that of the stationary wings the action of the wind is neutralized and the wheel is brought to rest; but as the wind slackens the wings are restored by the springs to their former positions and the wheel again commences motion.

By the above-described means, which contain the spirit of my invention, the windmill-wheel is made to revolve with nearly a uniform velocity, even in the ever-varying impulse of the wind, and is at the same time relieved from danger of injury in storms.

To enable others skilled in the art to make and use my invention, I will proceed to describe its construction.

I construct the wheel wholly of iron in the following manner: For a wheel of ten feet in diameter the hub is twelve inches in diameter, made of cast-iron. The arms are of round iron, five-eighths of an inch in diameter, and inserted into the hub with a five-inch disk. The hoop is of flat iron, one-fourth inch by one and one-fourth inch, and is secured to the outer ends of the arms, which are tenoned with a screw-nut. The wings are made of light sheet-iron four feet long and two feet wide at the outer end. The hinges by which the wings are hung to the arms are of strap-iron and rest on a washer and pin at the inner end and against the collets at the outer end. The spiral springs are made of steel wire. The strong spring is one-fourth inch in diameter and the weaker one three-sixteenths of an inch in diameter. Each spring is coiled about four inches in length loosely around the arm, with a tail seven inches long pressing against the back of the wing. The weaker spring is fastened to a collet, which moves round the arm and holds the spring by a set-screw at the proper tension. It will be perceived that by the movable collets the springs can be set to less or greater tension at pleasure, so as to limit the greatest speed of the wheel to the desired velocity, and that that velocity will be diminished instead of increased when the force of the wind passes a certain point in its intensity by producing a position in the forward wing which will neutralize the action of the wind on the after wing.

A represents the hub; B, the arms; C, the wings; D, the springs; E, the collets; H, the stops; G, the rim; I, the hinges.

Similar letters in the drawing refer to like parts.

Having thus fully described the nature of my invention, what I claim therein as new, and desire to secure by Letters Patent, is—

A double set of wings attached to the arms of a wind-wheel and to act in the following manner: One set—those that are behind the arms in the line of rotation—are stationary in their plane, except in a storm, and furnish the means of a constant power, while the other set—those which are forward of the arms in the rotation of the wheels—are controlled by the wind and springs so as to act automatically as a governor to the wheel, thus causing the wheel to revolve with nearly a uniform velocity, even in the varying impulse of the wind, and relieving it from danger of injury in a storm, substantially as described.

JOHN ELGAR.

Witnesses:
BENJN. HALLOWELL,
FRANCIS MILLER.